(12) United States Patent
Yang et al.

(10) Patent No.: US 10,312,512 B2
(45) Date of Patent: Jun. 4, 2019

(54) CATHODE OF THREE-DIMENSIONAL LITHIUM SECONDARY BATTERY AND METHOD OF FABRICATING THE SAME

(71) Applicant: Samsung Electronics Co., Ltd., Suwon-si, Gyeonggi-do (KR)

(72) Inventors: Hojung Yang, Suwon-si (KR); Hwiyeol Park, Ansan-si (KR); Kyunghoon Cho, Suwon-si (KR); Kyounghwan Kim, Seoul (KR); Seunghoon Nam, Seoul (KR); Huisu Jeong, Suwon-si (KR); Jinseok Heo, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 261 days.

(21) Appl. No.: 15/168,582

(22) Filed: May 31, 2016

(65) Prior Publication Data
US 2017/0084918 A1    Mar. 23, 2017

(30) Foreign Application Priority Data

Sep. 21, 2015    (KR) .................... 10-2015-0133091

(51) Int. Cl.
| | |
|---|---|
| H01M 4/02 | (2006.01) |
| H01M 4/04 | (2006.01) |
| H01M 4/52 | (2010.01) |
| H01M 4/131 | (2010.01) |
| H01M 4/525 | (2010.01) |
| H01M 10/0525 | (2010.01) |

(52) U.S. Cl.
CPC ......... *H01M 4/525* (2013.01); *H01M 4/0416* (2013.01); *H01M 4/0471* (2013.01); *H01M 4/131* (2013.01); *H01M 4/523* (2013.01); *H01M 10/0525* (2013.01); *H01M 2004/028* (2013.01)

(58) Field of Classification Search
CPC ........................... H01M 4/525; H01M 4/0471
See application file for complete search history.

(56) References Cited

U.S. PATENT DOCUMENTS

| | | | |
|---|---|---|---|
| 6,679,926 B1 * | 1/2004 | Kajiura | H01M 4/0402 264/614 |
| 8,187,740 B2 | 5/2012 | Nathan et al. | |
| 8,930,008 B2 | 1/2015 | Sastry et al. | |

(Continued)

FOREIGN PATENT DOCUMENTS

| | | |
|---|---|---|
| JP | 2009105063 A | 5/2009 |
| JP | 2010073339 A | 4/2010 |

(Continued)

OTHER PUBLICATIONS

Hui Xia et al., Texture effect on the electrochemical properties of LiCoO2 thin films prepared by PLD, article, 2007, pp. 7014-7021, 52, Electrochimica Acta.

(Continued)

*Primary Examiner* — Maria Laios
(74) *Attorney, Agent, or Firm* — Cantor Colburn LLP

(57) ABSTRACT

A cathode of a three-dimensional lithium secondary is defined by a sintered body including a cathode active material, in which a thickness of the sintered body is in a range of about 5 μm to about 30 μm, and an electrode density of the sintered body is in a range of about 3.7 g/cc to about 4.6 g/cc. The cathode active material may include a lithium cobalt oxide.

6 Claims, 6 Drawing Sheets

(56) References Cited

U.S. PATENT DOCUMENTS

| | | |
|---|---|---|
| 9,088,036 B2 | 7/2015 | Roh et al. |
| 2012/0040233 A1 | 2/2012 | Kim et al. |
| 2013/0045426 A1* | 2/2013 | Rosciano ............... C01F 7/002 429/320 |
| 2013/0183589 A1* | 7/2013 | Minamida ............ H01M 4/505 429/319 |
| 2014/0186698 A1 | 7/2014 | Cobb et al. |
| 2015/0099188 A1* | 4/2015 | Holme .............. H01M 10/0525 429/231.95 |
| 2016/0204464 A1 | 7/2016 | Cho et al. |

FOREIGN PATENT DOCUMENTS

| | | |
|---|---|---|
| KR | 100982325 B1 | 9/2010 |
| KR | 1020160088126 A | 7/2016 |

OTHER PUBLICATIONS

Myounggu Park et al., A review of conduction phenomena in Li-ion batteries, journal, 2010, pp. 7904-7929, 195, Journal of Power Sources.

Seung-Wan Song et al., Cycling-Driven Structural Changes in a Thin-Film Lithium Battery on Flexible Substrate, article, 2009, pp. A159-A162, 12 (8), Electrochemical and Solid-State Letters.

Shunsuke Yamakawa et al., Numerical study of Li diffusion in polycrystalline LiCoO2, article, 2013, pp. 199-205, 233, Journal of Power Sources.

* cited by examiner

CATHODE OF THREE-DIMENSIONAL LITHIUM SECONDARY BATTERY AND METHOD OF FABRICATING THE SAME

CROSS-REFERENCE TO RELATED APPLICATION

This application claims priority to Korean Patent Application No. 10-2015-0133091, filed on Sep. 21, 2015, and all the benefits accruing therefrom under 35 U.S.C. § 119, the content of which in its entirety is herein incorporated by reference.

BACKGROUND

1. Field

The disclosure relates to a cathode of a three-dimensional lithium secondary battery and a method of fabricating the cathode of a three-dimensional lithium secondary battery, and more particularly, to a cathode that increases the energy density of a three-dimensional lithium secondary battery and a method of fabricating the cathode of the three-dimensional lithium secondary battery.

2. Description of the Related Art

Demand for lithium secondary batteries has rapidly increased in line with the development of mobile information terminals, such as smart phones and notebook personal computers, and next-generation clean energy automobiles, such as electric vehicles ("EV"s).

Recently, the demand for lithium secondary batteries is further increasing due to desired features thereof such as higher voltage than nickel-cadmium batteries or nickel-hydrogen batteries and higher energy density per weight. Lithium oxides are generally used as a cathode active material for lithium batteries, and graphite is generally used as an anode active material for lithium batteries.

Much research has been performed to further enhance the energy density and rapid charge-discharge of lithium batteries. An enhanced energy density may increase a capacity of lithium batteries, and an enhanced rapid charge-discharge may increase a charge-discharge speed of lithium batteries.

The three-dimensional lithium secondary battery may have both a cathode active material layer and an anode active material layer facing each other. Then, a facing area between the cathode active material layer and the anode active material layer may increase, and accordingly, a charging capacity per area may increase.

SUMMARY

In a three-dimensional lithium secondary battery, the cathode active material layer and the anode active material layer are typically formed by a vapor deposition method, which may be time-consuming. When the cathode active material is formed by such a vapor deposition method, a fabrication time for the cathode active material layer may be long, and thus, the fabrication time of the three-dimensional lithium secondary battery may be long.

Exemplary embodiments of the invention are directed to a cathode of a three-dimensional lithium secondary battery, where the cathode may be fabricated by sintering at a high temperature and may have improved battery characteristics.

Exemplary embodiments of the invention are directed to a method of fabricating the cathode.

According to an exemplary embodiment, a cathode of a three-dimensional lithium secondary is defined by a sintered body including a cathode active material, where a thickness of the sintered body is in a range of about 5 micrometers ($\mu m$) to about 30 $\mu m$ and an electrode density the sintered body is in a range of about 3.7 grams per cubic centimeters (g/cc) to about 4.6 g/cc.

In an exemplary embodiment, the cathode active material may include a plurality of elliptic or circular grains which is irregularly stacked when viewed in a side cross-sectional view of the cathode.

In an exemplary embodiment, the electrode density of the sintered body may be in a range of about 4.0 g/cc to about 4.6 g/cc.

In an exemplary embodiment, the cathode active material may include a lithium transition metal oxide.

In an exemplary embodiment, the cathode active material may include a lithium cobalt oxide.

In an exemplary embodiment, the cathode may include an inner collector and cathode layers respectively disposed on opposite sides of the inner collector.

According to another exemplary embodiment, a cathode of a three-dimensional lithium secondary battery is defined by a sintered body including a cathode active material, where grains of the cathode has a mean longitudinal diameter in a range of about 2.0 $\mu m$ to about 4.0 $\mu m$.

According to another exemplary embodiment, a method of fabricating a cathode of a three-dimensional lithium secondary battery includes: preparing an active material slurry by mixing a cathode active material powder and a binder powder in a solvent; fabricating an active material sheet to have a predetermined thickness by using the active material slurry; drying up the active material sheet; and fabricating the cathode by sintering the dried up active material sheet at a temperature in a range of about 1,000° C. to about 1,050° C. for a time duration in a range of about 10 minutes to about 5 hours and by removing the binder in the active material sheet.

In an exemplary embodiment, the predetermined thickness of the active material sheet may be in a range of about 7 $\mu m$ to about 44 $\mu m$.

In an exemplary embodiment, the fabricated cathode may have an electrode density in a range of about 3.7 g/cc to about 4.6 g/cc.

BRIEF DESCRIPTION OF THE DRAWINGS

These and/or other features will become apparent and more readily appreciated from the following description of the exemplary embodiments, taken in conjunction with the accompanying drawings, in which.

DETAILED DESCRIPTION

Figure 1:
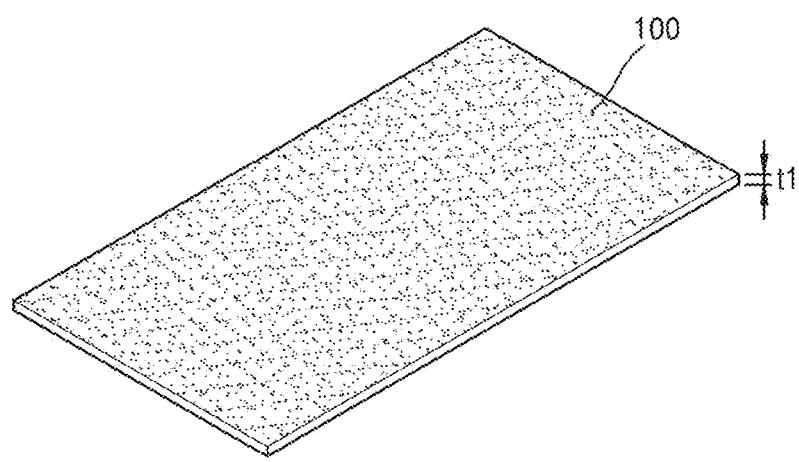
FIG. 1 is a perspective view of a cathode of a three-dimensional lithium secondary battery according to an exemplary embodiment.

Reference will now be made in detail to exemplary embodiments, examples of which are illustrated in the accompanying drawings, where like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Hereinafter, the inventive concept will be described more fully with reference to the accompanying drawings, in which exemplary embodiments of the inventive concept are shown. This inventive concept may, however, be embodied in many different forms and should not be construed as limited to the exemplary embodiments set forth herein. Rather, these embodiments are provided so that this disclosure will be thorough and complete, and will fully convey the scope of the inventive concept to one of ordinary skill in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments will be described in detail with reference to the accompanying drawings.

FIG. 1 is a perspective view of a cathode 100 of a three-dimensional lithium secondary battery according to an exemplary embodiment.

Referring to FIG. 1, an exemplary embodiment of the cathode 100 may include a cathode active material. The cathode active material may include a lithium transition metal oxide. The transition metal may include at least one of cobalt (Co), nickel (Ni), and manganese (Mn). In one exemplary embodiment, for example, the cathode 100 may include lithium cobalt oxide ($LiCoO_2$).

The cathode 100 may be a sintered body including the cathode active material only. Materials such as a binder included in an operation of fabricating the cathode 100 may volatilize and disappear during a sintering process, which will be described below.

A thickness t1 of the cathode 100 may be in a range of about 5 μm to about 30 μm. When the thickness of the cathode 100 is less than about 5 μm, an energy density of a lithium secondary battery including the cathode 100 may substantially decrease. When the thickness of the cathode 100 is greater than about 30 μm, an increase rate of the energy density may be substantially lowered. Since grain sizes included in the cathode 100 may increase as the thickness of the cathode 100 increases, ion conductivity may decrease and a charge-discharge speed may decrease when the thickness of the cathode 100 increases. A size of the cathode 100 may vary depending on a three-dimensional lithium secondary battery including the cathode 100.

An electrode density of the cathode 100 may be in a range of about 3.7 grams per cubic centimeters (g/cc) to about 4.6 g/cc. In one exemplary embodiment, for example, the electrode density of the cathode 100 may be in a range of about 4.0 g/cc to about 4.6 g/cc. The electrode density of the cathode 100 may vary depending on a heat treatment temperature and a heat treatment time. When the electrode density is less than about 3.7 g/cc, the energy density of the three-dimensional lithium secondary battery including the cathode 100 may be low. When the electrode density is greater than about 4.6 g/cc, grain sizes of the cathode 100 may increase during a sintering process, and an electrical conductivity may be lowered. In addition, when the electrode density is greater than about 4.6 g/cc, a crack may occur in the cathode 100 while the three-dimensional lithium secondary battery including the cathode 100 is in use.

The cathode 100 may have a plate-like shape, and in a side cross-sectional view, grains may have an elongated shape in a horizontal direction of the cathode 100 and may have an ellipse-like or a circle-like shape. A mean longitudinal diameter of grains may be approximately about 2.0 μm to about 4.0 μm. When a longitudinal diameter of grains is greater than about 4.0 μm, the ion conductivity may decrease. When the longitudinal diameter of grains is less than about 2.0 μm, the electrode density may decrease and thus, the energy density per volume may be small.

Figure 2:
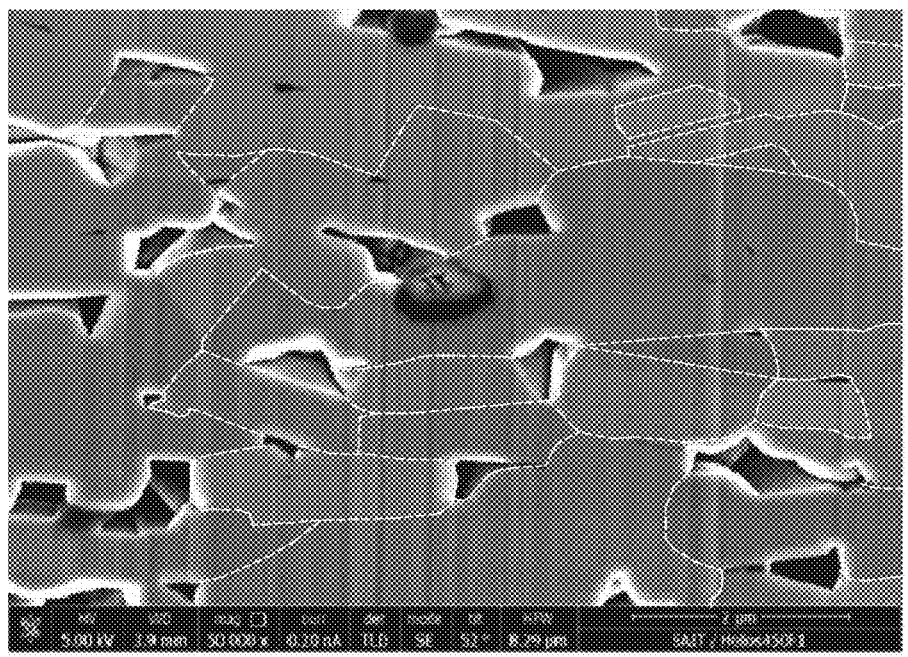
FIG. 2 is a scanning electron microscope photograph showing grain sizes of a cathode of a three-dimensional lithium secondary battery according to an exemplary embodiment.

FIG. 2 is a scanning electron microscope photograph showing grain sizes of a cathode of a three-dimensional lithium secondary battery according to an exemplary embodiment. Dashed lines are added in FIG. 2 to show boundaries of grains of the cathode. Referring to FIG. 2, the cathode, which was sintered at about 1,025° C. for about 2 hours, has an electrode density of about 4.1 g/cc and a mean longitudinal diameter of grains of about 2.8 μm.

Figure 3A:
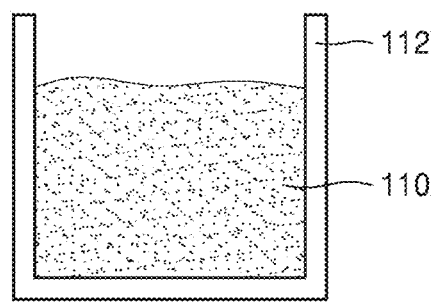
FIGS. 3A through 3C illustrate a method of fabricating a cathode according to an exemplary embodiment.
Figure 3B:
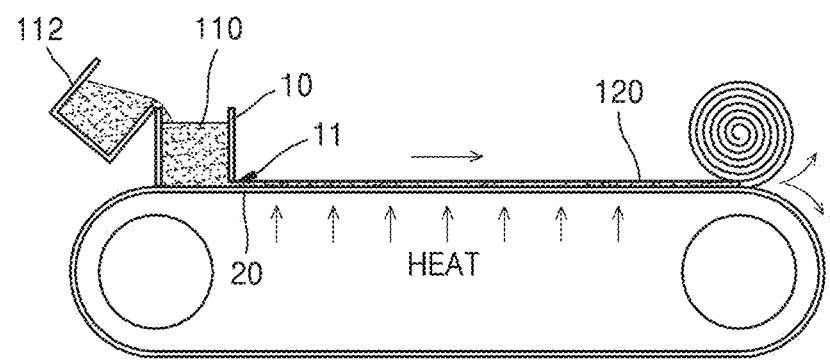
Figure 3C:
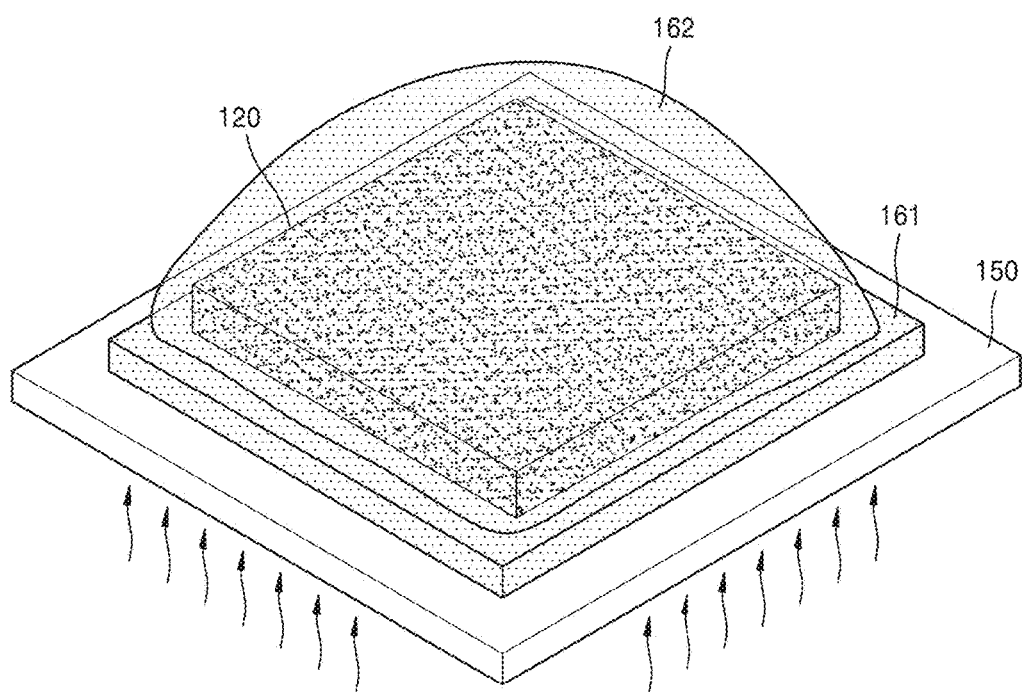

FIGS. 3A through 3C illustrate a method of fabricating a cathode according to an exemplary embodiment.

Referring to FIG. 3A, in an exemplary embodiment of a method of fabricating a cathode, an active material slurry 110 may be prepared by mixing a cathode active material powder including lithium cobalt oxides and a binder powder with a solvent in a container 112. A plasticizer may be further included in the active material slurry 110. A binder may include, for example, polyvinyl butyral ("PVB"). The solvent may include toluene, ethanol or acetone, for example. A ball mill may be used to uniformly mix the cathode active material powder and the binder powder with the solvent. An active material sheet (refer to 120 in FIG. 3B) may be formed by using the active material slurry 110.

FIG. 3B illustrates an exemplary embodiment of a process of fabricating the active material sheet 120 by using the active material slurry 110. Referring to 3B, the active material sheet 120 may be fabricated in a shape of a thick film tape by using a tape casting process. In one exemplary embodiment, for example, after filling the active material slurry 110 in a dam 10 with an exit 11 having a wide width and a low height, the active material slurry 110 may be released through the exit 11 of the dam 10 onto a carrier belt 20. Then, the active material sheet 120 may be formed on the carrier belt 20. In one exemplary embodiment, for example, a thickness of the active material sheet 120 formed in the shape of the thick film tape on the carrier belt 20 may be in a range of about 7 μm to about 44 μm. The thickness of the active material sheet 120 may be controlled by adjusting a height of the exit 11 of the dam 10 or by adjusting viscosity of the active material slurry 110.

When the active material sheet 120 is coated on the carrier belt 20, the solvent may be removed by heating the active material sheet 120 on the carrier belt 20. A heating temperature may vary depending on the solvent. In such an embodiment, as described above, the active material sheet 120 in the shape of the thick film tape may be obtained.

After the active material sheet 120 is dried up, the active material sheet 120 may be cut to a desired size.

In such an embodiment, the active material sheet 120 may be sintered. FIG. 3C illustrates an exemplary embodiment of a sintering method. Referring to FIG. 3C, after the active material sheet 120 is disposed on a substrate 150, the substrate 150 and the active material sheet 120 may be put in a furnace (not shown), and be sintered in an inert atmosphere such as nitrogen or argon. The substrate 150 may use materials which do not react with the active material sheet 120 during the sintering. The substrate 150 may be, for example, an alumina ($Al_2O_3$) substrate. The sintering may be performed at a temperature in a range of about 1,000° C. to about 1,050° C. for a time duration in a range of about 10 minutes to about 5 hours. The sintering process may be performed by placing a lithium cobalt oxide powder layer 161 between the substrate 150 and the active material sheet 120, and by covering the active material sheet 120 on the substrate 150 with a lithium cobalt oxide powder 162.

In the sintering process, a binder in the active material sheet 120 may be removed. As a result, the cathode (100 of FIG. 1) may be fabricated, which is a sintered body including a cathode active material only.

According to an exemplary embodiment, a fabrication time of a cathode may be shortened in comparison with a conventional vapor deposition method.

In such an embodiment, a three-dimensional lithium secondary battery with a high-speed charge characteristic and an increased energy density may be fabricated using the cathode.

Figure 4:
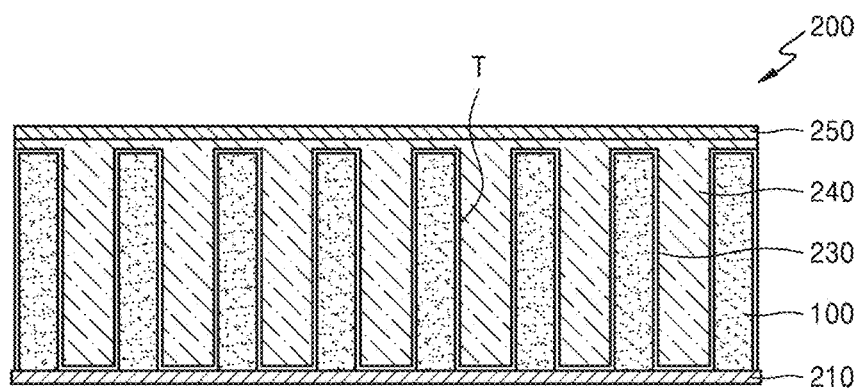
FIG. 4 is a cross-sectional view of a three-dimensional lithium secondary battery including a cathode according to an exemplary embodiment.

FIG. 4 is a cross-sectional view of a three-dimensional lithium secondary battery 200 fabricated by using a cathode 100 according to an exemplary embodiment.

Referring to FIG. 4, in an exemplary embodiment of a three-dimensional lithium secondary battery 200, a plurality of cathodes 100 may be disposed on a cathode collector 210 to be perpendicular to the cathode collector 210. An electrolyte layer 230, an anode 240 and an anode collector 250 may be sequentially disposed on the cathodes 100. The electrolyte layer 230 may cover a surface of cathodes 100, and a surface of the cathode collector 210 exposed by cathodes 100. The anode 240 may fill a trench T defined on the electrolyte layer 230 between cathodes 100. The anode 240 may cover the electrolyte layer 230. The anode collector 250 on the anode 240 may be disposed in parallel with the cathode collector 210.

The cathode 100 may include a cathode active material only. The cathode 100 may be fabricated by sintering a cathode forming material including a cathode active material powder, a binder and a solvent. In the sintering process, the binder and the solvent may volatilize and accordingly, the cathode 100 including the cathode active material only may be obtained.

The cathode collector 210 may include a conductive metal such as Cu, Au, Pt, Ag, Zn, Al, Mg, Ti, Fe, Co, Ni, Ge, In and Pd. The cathode collector 210 may be in a shape of a thin and flat plate. A thickness of the cathode collector 210 may be in a range of about 1 μm to about 15 μm.

The cathode 100 may include lithium transition metal oxide. A transition metal may include at least one of Co, Ni and Mn. In one exemplary embodiment, for example, the cathode 100 may include lithium cobalt oxide ($LiCoO_2$).

According to one or more exemplary embodiments, the cathode may have a thickness in a range of about 5 μm to about 30 μm. When the thickness of the cathode 100 is less than about 5 μm, an energy density of the three-dimensional lithium secondary battery implementing the cathode 100 may substantially or significantly decrease. When the thickness of the cathode 100 is greater than about 30 μm, an increase rate of the energy density may significantly slow down. In addition, sizes of grains included in the cathode 100 may increase with an increase of the thickness of the cathode 100. Accordingly, ion conductivity may decrease and a charge-discharge speed may decrease when the thickness of the cathode increases.

The electrolyte layer 230 may be formed as a solid. In one exemplary embodiment, for example, the electrolyte layer 230 may be formed with lithium phosphorus oxynitride (LiPON). In such an embodiment, the electrolyte layer 230 may include sulfide-based and garnet-based solid electrolytes. The electrolyte layer 230 may be formed by a physical vapor deposition method or a chemical vapor deposition method.

The electrolyte layer 230 may be formed as a liquid. The electrolyte layer 230 may use lithium hexafluorophosphate (LiPF$_6$) mixed in an organic solvent. The organic solvent may use diethyl carbonate and fluoroethyl carbonate by mixing them at a ratio of 6:4.

The anode 240 may include an anode active material and the binder. In a lithium secondary battery, the anode 240 may include or be formed of a material including an alloy with lithium or a material capable of reversible occlusion and release of lithium.

The anode active material may include, for example, at least one of silicon, germanium, metals, carbon-based materials, metal oxides and lithium metal nitrides.

The carbon-based materials may be at least one of graphite, graphite carbon fiber, coke, mesocarbon microbead ("MCMB"), polyacene, pitch-based carbon fiber and hard carbon.

The binder included in the anode active material layer may use the same binder included in the cathode active material layer.

The thickness of the anode 240 may be approximately about 50 nm to about 40 μm.

The anode collector 250 may be in a shape of a foil. The anode collector 250 may include at least one metal selected from copper, stainless steel, nickel, aluminum and titanium.

Performance of the cathode 100 for a three-dimensional lithium secondary battery was tested according to one or more embodiments as described below.

Fabrication Example 1 of Cathode

A slurry including a lithium cobalt oxide powder having a mean grain diameter of about 1 μm, polyvinyl butyral as a binder, dibutyl phthalate as a plasticizer, and a mixture of toluene and ethanol with a predetermined ratio as a solvent was prepared.

The tape casing method described above was applied to the slurry to fabricate sheets at a thickness of about 14 μm and about 28 μm, and then, the sheets was dried up at about 200° C. In a drying process, a mixed solvent volatilized. The sheet was cut in a size of about 7 millimeters (mm)×about 7 mm (length×breadth).

Next, the sheet was heat treated in a furnace at a predetermined temperature for a predetermined time. In the heat treatment process, the binder and the plasticizer were removed. Heat treatment temperature and heat treatment time were changed depending on exemplary embodiments and comparative examples.

Fabrication of Lithium Secondary Batteries According to Exemplary Embodiments 1 to 5

After one cathode obtained in accordance with the fabrication example 1 was placed, a separator was placed on the cathode to form a room inside of the separator, and a liquid electrolyte was filled in the room. Then, a lithium foil was placed on the separator to cover the room. The liquid electrolyte included LiPF$_6$ dissolved at a concentration of about 1.3 M in a mixture of diethyl carbonate and fluoroethyl carbonate at a volume ratio of about 6:4.

Fabrication of a Lithium Secondary Battery According to Comparative Examples 1, 3

Comparative examples 1, 3 are cases, where the electrode density is about 4.7 g/cc, due to differences in heat treatment temperatures and heat treatment time from exemplary embodiments 1 to 5, and lithium secondary batteries was fabricated for a measurement of cathode characteristics, while other components were identical with those of exemplary embodiments 1 to 5.

Fabrication of a Lithium Secondary Battery According to Comparative Example 2

Cathode slurry was fabricated by mixing lithium cobalt oxide, carbon black and a polyvinylidene difluoride ("PVdF") binder in an N-Methyl-2-pyrrolidone ("NMP") solvent. The fabricated cathode slurry was pasted at a thickness of about 50 μm, dried up at about 200° C., and a cathode was thereby fabricated. The lithium secondary battery of comparative example 2 is different from comparative examples 1, 3 with respect to the structure of the cathode, but all other components were identically fabricated.

Evaluation Methods for Exemplary Embodiments 1 to 5 and Comparative Examples 1 to 3

For an electrochemical evaluation, an initial charge-discharge was performed with a current of about 0.1 coulomb (C). A capacity evaluation was performed with measurements, with about 0.2 C charge-discharge, in a range of about 4.3 volts (V) to about 4.45 V. For a high-rate discharge characteristic evaluation, the charge was fixed at about 0.5 C and a discharge speed was increased to about 0.2 C, about 0.5 C, about 1 C and about 2 C, and then, an individual discharge amount was compared with a discharge amount at about 0.2 C. An initial efficiency was found as a ratio of a charge amount over the discharge amount in a first cycle.

Table 1 shows characteristics and performance of lithium secondary batteries according to exemplary embodiments 1, 2 and comparative examples 1, 2.

TABLE 1

|  | Exemplary Embodiment 1 | Exemplary Embodiment 2 | Comparative Example 1 | Comparative Example 2 |
|---|---|---|---|---|
| Area Density (mg/cm$^2$) |  | 4.5 |  | 20.7 |
| Heat Treatment Temperature (° C.) | 1025 | 1050 | 1050 |  |
| Heat Treatment Time (hour) | 2 | 2 | 6 |  |

TABLE 1-continued

|  |  | Exemplary Embodiment 1 | Exemplary Embodiment 2 | Comparative Example 1 | Comparative Example 2 |
|---|---|---|---|---|---|
| Electrode Density (g/cc) | | 4.1 | 4.5 | 4.7 | 3.8 |
| Initial Efficiency (%) | | 93.5 | 92.5 | 89.2 | 98.3 |
| Capacity (mAh/g) | 4.3 V (mAh/cc) | 152 (623) | 150 (675) | 143 (672) | 158 (585) |
| | 4.35 V | 159 | 158 | 147 | 166 |
| | 4.4 V | 167 | 165 | 154 | 173 |
| | 4.45 V | 175 | 173 | 161 | 181 |
| High-rate Discharge | 0.5 C/0.2 C | 1.00 | 0.98 | 0.95 | 0.99 |
| | 1 C/0.2 C | 0.99 | 0.96 | 0.89 | 0.95 |
| | 2 C/0.2 C | 0.98 | 0.92 | 0.77 | 0.48 |

Referring to Table 1, a capacity per volume of the electrode of exemplary embodiments 1, 2 and comparative example 1 is greater than that of comparative example 2. On the other hand, even though a battery capacity of comparative example 1 is similar to those of exemplary embodiments 1, 2, a high-rate discharge characteristic of comparative example 1 is inferior to those of exemplary embodiments 1, 2. In addition, as shown in FIG. 5, a life expectancy characteristic of comparative example 1 is relatively poor.

In comparative example 1, a heat treatment amount (heat treatment temperature×heat treatment time) was relatively greater than that in exemplary embodiments 1, 2 and thus, grain sizes of cathode increased, and accordingly, an ion transfer distance inside each grain increased, such that comparative example 1 may have less battery capacity, and lower high-rate discharge and life expectancy characteristic.

Figure 5:
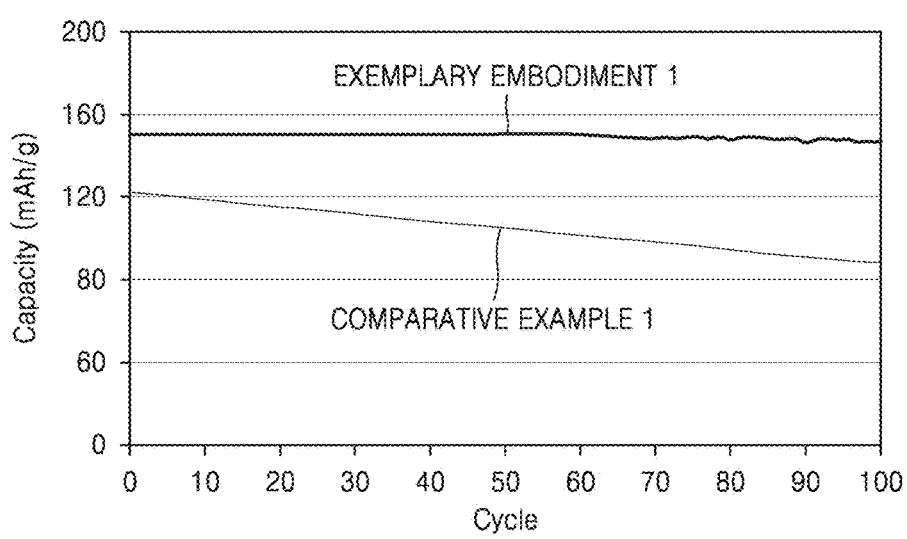
FIG. 5 is a graph illustrating life expectancy characteristics of an exemplary embodiment and a comparative example 1.

FIG. 5 is a graph illustrating life expectancy characteristics of exemplary embodiment 1 and comparative example 1. As shown in FIG. 5, a life expectancy characteristic of the lithium secondary battery according to exemplary embodiment 1 is better than that of the lithium secondary battery according to comparative example 1.

Table 2 shows characteristics and performance of lithium secondary batteries according to exemplary embodiments 3 to 5 and comparative example 3.

Figure 6:
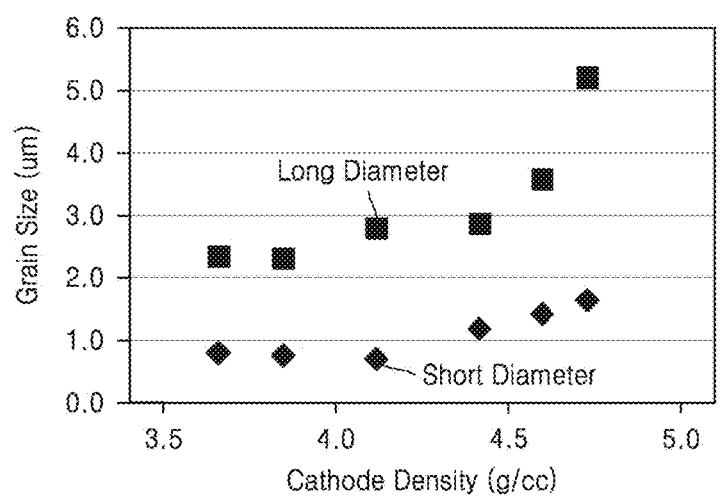
FIG. 6 is a graph illustrating an electrode density and a grain size of a cathode in accordance with heat treatment according to an exemplary embodiment.

FIG. 6 is a graph illustrating an electrode density and a grain size of a cathode in accordance with heat treatment in exemplary embodiments. The grain size is the grain size viewed from a side cross-section of the cathode. A shape of the grain may be an ellipse, and may have a long or longitudinal diameter and a short or transverse diameter.

Referring to FIG. 6, as the density of the cathode increases, the grain size increases. A mean transverse diameter of grains of the cathode does not show a big change with respect to the density. On the other hand, a mean longitudinal diameter of grains of the cathode, which is generally in an intercalation direction of lithium ion, shows a big change in the density at about 4.7. An increase in the grain size causes an ion transfer distance longer and thereby causing a reduction in a charge-discharge speed. The mean longitudinal diameter of grains of the cathode according to exemplary embodiments may be in a range of about 2.0 μm to about 4.0 μm.

Figure 7:
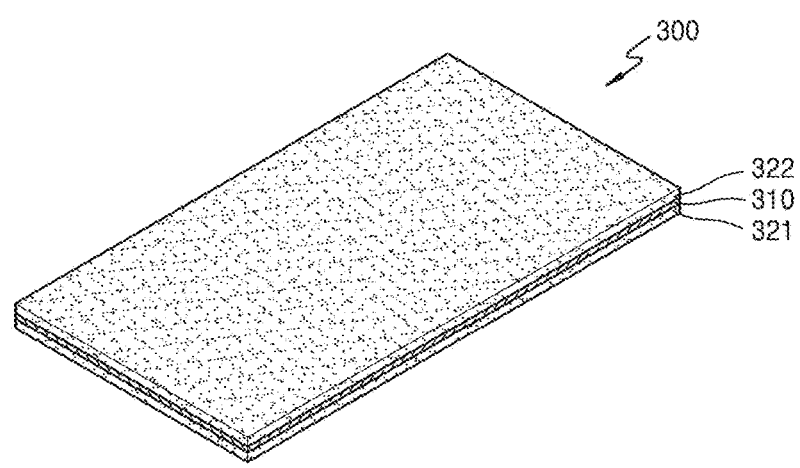
FIG. 7 is a perspective view of a cathode according to an exemplary embodiment.

FIG. 7 is a perspective view of a cathode 300 according to an exemplary embodiment.

Referring to FIG. 7, in an exemplary embodiment of a cathode 300, a first cathode layer 321 and a second cathode layer 322 may be respectively disposed on both sides of an inner collector 310. The first cathode layer 321 and the second cathode layer 322 may each be identical with the

TABLE 2

|  |  | Exemplary Embodiment 3 | Exemplary Embodiment 4 | Exemplary Embodiment 5 | Comparative Example 3 |
|---|---|---|---|---|---|
| Area Density (mg/cm$^2$) | | | 9.0 | | 9.0 |
| Heat Treatment Temperature (° C.) | | 1000 | 1025 | 1025 | 1050 |
| Heat Treatment Time (hour) | | 2 | 1 | 2 | 6 |
| Electrode Density (g/cc) | | 3.7 | 3.9 | 4.1 | 4.7 |
| Initial Efficiency (%) | | 94.2 | 94.2 | 93.6 | 80 |
| Capacity (mAh/g) | 4.3 V (mAh/cc) | 149 (551) | 151 (589) | 147 (603) | 128 (602) |
| | 4.35 V | 157 | 158 | 154 | 133 |
| | 4.4 V | 164 | 166 | 162 | 139 |
| | 4.45 V | 172 | 174 | 169 | 145 |
| High-rate Discharge | 0.5 C/0.2 C | 0.99 | 0.99 | 0.99 | 0.80 |
| | 1 C/0.2 C | 0.99 | 0.97 | 0.97 | 0.57 |
| | 2 C/0.2 C | 0.97 | 0.84 | 0.84 | 0.30 |

Referring to Table 2, capacities and high-rate characteristics of exemplary embodiments 3 to 5 are relatively good. On the other hand, comparative example 3 shows that an initial efficiency is relatively low and high-rate characteristics are relatively poor. In addition, comparative example 3 shows a higher heat treatment amount but shows lower capacity and life expectancy characteristic than those of exemplary embodiments 3 to 5.

cathode 100 of FIG. 1. The inner collector 310 may be formed by coating a paste including conductive materials such as Ni on a surface of the first cathode layer 321. The inner collector 310 may have a thickness of less than about 1 μm.

The first cathode layer 321 and the second cathode layer 322 may include a same material as each other, and may have a same thickness as each other.

An anode of an exemplary embodiment of a lithium secondary battery may be a sintered body at a high temperature, and the three-dimensional lithium secondary battery with the cathode applied thereto may have an increased energy density and an increased electrode capacity. In such an embodiment, ion conductivity increases and a rapid charge-discharge are enhanced due to grain sizes controlled to have a predetermined size.

According to an exemplary embodiment of a method of fabricating a cathode of a three-dimensional lithium secondary battery, a fabrication time of the cathode may be reduced.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A cathode of a three-dimensional lithium secondary battery, wherein
   the cathode is defined by a sintered body comprising a cathode active material,
   a thickness of the sintered body is in a range of about 5 μm to about 30 μm, and
   an electrode density of the sintered body is in a range of about 3.7 g/cc to about 4.6 g/cc,
   wherein the cathode is disposed on a cathode collector of the three-dimensional lithium secondary battery to be perpendicular to the cathode collector.

2. The cathode of the three-dimensional lithium secondary battery of claim 1, wherein the cathode active material comprises a plurality of elliptical or circular grains which is irregularly stacked when viewed in a side cross-sectional view of the cathode.

3. The cathode of a three-dimensional lithium secondary battery of claim 1, wherein the electrode density of the sintered body is in a range of about 4.0 g/cc to about 4.6 g/cc.

4. The cathode of the three-dimensional lithium secondary battery of claim 1, wherein the cathode active material comprises a lithium transition metal oxide.

5. The cathode of the three-dimensional lithium secondary battery of claim 4, wherein the cathode active material comprises a lithium cobalt oxide.

6. The cathode of the three-dimensional lithium secondary battery of claim 1, wherein the cathode comprises an inner collector and cathode layers, which are respectively disposed on opposite sides of the inner collector.

* * * * *